(12) United States Patent
Bass et al.

(10) Patent No.: US 8,965,794 B2
(45) Date of Patent: Feb. 24, 2015

(54) RETAIL IDENTIFICATION AND INVENTORY SYSTEM

(75) Inventors: Michael A. Bass, Chagrin Falls, OH (US); Michael Chipchak, Fairview Park, OH (US); William R. Mutch, North Ridgeville, OH (US); Jamie Peltz, Beachwood, OH (US); Richard W. Ryai, Sr., North Royalton, OH (US); Kevin Shepard, Davenport, IA (US)

(73) Assignee: Hy-Ko Products, Northfield, OH (US)

( * ) Notice: Subject to any disclaimer, the term of this patent is extended or adjusted under 35 U.S.C. 154(b) by 0 days.

(21) Appl. No.: 12/321,234

(22) Filed: Jan. 16, 2009

(65) Prior Publication Data

US 2009/0228795 A1 Sep. 10, 2009

Related U.S. Application Data

(63) Continuation-in-part of application No. 10/633,933, filed on Aug. 4, 2003.

(60) Provisional application No. 61/011,261, filed on Jan. 16, 2008, provisional application No. 60/452,893, filed on Mar. 7, 2003.

(51) Int. Cl.
*G06Q 10/08* (2012.01)

(52) U.S. Cl.
CPC .................................... *G06Q 10/087* (2013.01)
USPC ............................ 705/28; 235/385; 705/26.1

(58) Field of Classification Search
CPC combination set(s) only.
See application file for complete search history.

(56) References Cited

U.S. PATENT DOCUMENTS

| | | | |
|---|---|---|---|
| 4,924,217 A * | 5/1990 | Uwai | 345/82 |
| 6,336,053 B1 * | 1/2002 | Beatty | 700/108 |
| 6,650,225 B2 * | 11/2003 | Bastian et al. | 340/5.92 |
| 6,736,316 B2 * | 5/2004 | Neumark | 235/383 |
| 6,774,783 B1 * | 8/2004 | Reid | 340/505 |
| 6,959,862 B2 | 11/2005 | Neumark | |
| 7,010,498 B1 | 3/2006 | Berstis | |
| 7,480,867 B1 * | 1/2009 | Racine et al. | 715/744 |
| 2001/0056385 A1 | 12/2001 | Timms et al. | |
| 2005/0165649 A1 * | 7/2005 | Mahaffey et al. | 705/26 |
| 2005/0182692 A1 * | 8/2005 | Woos | 705/27 |
| 2005/0216120 A1 | 9/2005 | Rosenberg et al. | |

OTHER PUBLICATIONS

Int'l Search Report, Apr. 3, 2009, Hy-Ko Products Company.

* cited by examiner

*Primary Examiner* — Luna Champagne
(74) *Attorney, Agent, or Firm* — McDonald Hopkins LLC

(57) ABSTRACT

An interactive retail identification system for identifying a retail object based upon known or identified features of master object is disclosed, wherein the system utilizes a graphical user interface having a computer display screen for displaying a plurality of input fields related to a retail object and an input device for selecting variables based upon a physical inspection of a known master object having known or identifiable features. The graphical user interface is electronically connected to a database which identifies a specific retail object equivalent to the master object through comparison of the retail object variables. The systems includes a plurality of compartments for holding retail objects based upon the retail object variables and an indicator for identifying the compartment having the retail object is provided.

16 Claims, 12 Drawing Sheets

RETAIL IDENTIFICATION AND INVENTORY SYSTEM

CROSS-REFERENCE TO RELATED APPLICATION

This application claims priority from U.S. Provisional Patent Application Ser. No. 61/011,261, entitled Retail Identification and Inventory System, filed on Jan. 16, 2008, which is hereby incorporated by reference in its entirety, and is a continuation-in-part of U.S. patent application Ser. No. 10/633,933, entitled Object Identification System, filed on Aug. 4, 2003, which is hereby incorporated by reference in its entirety, which claims priority from U.S. Provisional Patent Application Ser. No. 60/452,893, entitled Object Identification System, filed on Mar. 7, 2003, which is also hereby incorporated by reference in its entirety.

FIELD OF THE INVENTION

The invention relates generally to the field of systems for identifying retail objects and, more particularly, to an interactive retail identification system for identifying a retail object.

BACKGROUND OF THE INVENTION

The identification of objects that are relatively fungible, but possess minute yet important nuances or details, can be a difficult, tedious and time-consuming affair. As will be readily recognized by those familiar with such enterprises, a failure to accurately identify such objects with regularity can have unintended or undesirable consequences. Such situations are well known in many retail fields, such as the hardware field, the cosmetic field, and the clothing field.

One illustrative example is the hardware field. In additional to numerous objects in the hardware field possessing minute yet important nuances, fasteners stand out as particularly cumbersome retail objects. Fasteners such as screws, nuts, bolts, washers, pins, hooks, or the like are provided with thousands of different specifications that are generally denoted in the metric system or British system. Therefore, the fasteners must initially be arranged in an orderly manner so as to allow a person to locate a desired fastener according to these systems.

Further, for example, screws can having many functional variables such as length, pitch, thread count, tip shape, head shape, Phillips or regular, or material composition that make it difficult to find the proper screw for purchase. Typically, such fasteners are stored in separate compartments of storage units and/or dispensers (hereinafter referred to as "units") such as bulk silos, boxes, shelves, and the like according to these functional variables. The compartments are generally labeled with information pertaining to the specifications or functional variables of the fasteners contained therein. However, such storage methods are inefficient, as an employee or customer looking for a desired fastener must visually scan though numerous compartments before locating the retail object desired. In addition, many people do not know the exact type of fastener that they are looking for, and are forced to rummage through each compartment and "eyeball" what is thought to be the correct fastener.

The shortcomings of such organizational systems are numerous. For example, it is time consuming and labor intensive to locate the desired fastener. In addition, the contents of different compartments often become mixed as employees and customers search for the desired fastener. Moreover, such systems do not provide for a reliable method off tracking of inventory, nor do they readily permit systematic tracking of other variables that may be of interest. Finally, none of the previously known organizational or identification systems appear to allow for the use of common consumer computer systems and other similar construction materials (such as off-the-shelf personal computers, personal digital assistants, LEDs, LCDs, etc.).

Therefore, a system that can provide better organizational structure and user-friendly operation would be a great improvement over the know prior know systems. Such a system would not only be valuable in the hardware field, but in any retail field where retail objects possess minute yet important nuances or functional variables.

SUMMARY OF THE INVENTION

An interactive retail identification system for identifying a retail object based upon known or identified features of master object is disclosed, wherein the system utilizes a graphical user interface having a computer display screen for displaying a plurality of input fields related to a retail object and an input device for selecting variables based upon a physical inspection of a known master object having known or identifiable features. The graphical user interface is electronically connected to a database, which identifies a specific retail object equivalent to the master object through comparison of the retail object variables. The system includes a plurality of compartments for holding retail objects based upon the retail object variables and an indicator for identifying the compartment having the retail object is provided.

DESCRIPTION OF THE DRAWINGS

Objects and advantages together with the operation of the invention may be better understood by reference to the following detailed description taken in connection with the following illustrations, wherein.

DETAILED DESCRIPTION OF THE INVENTION

Figure 1:
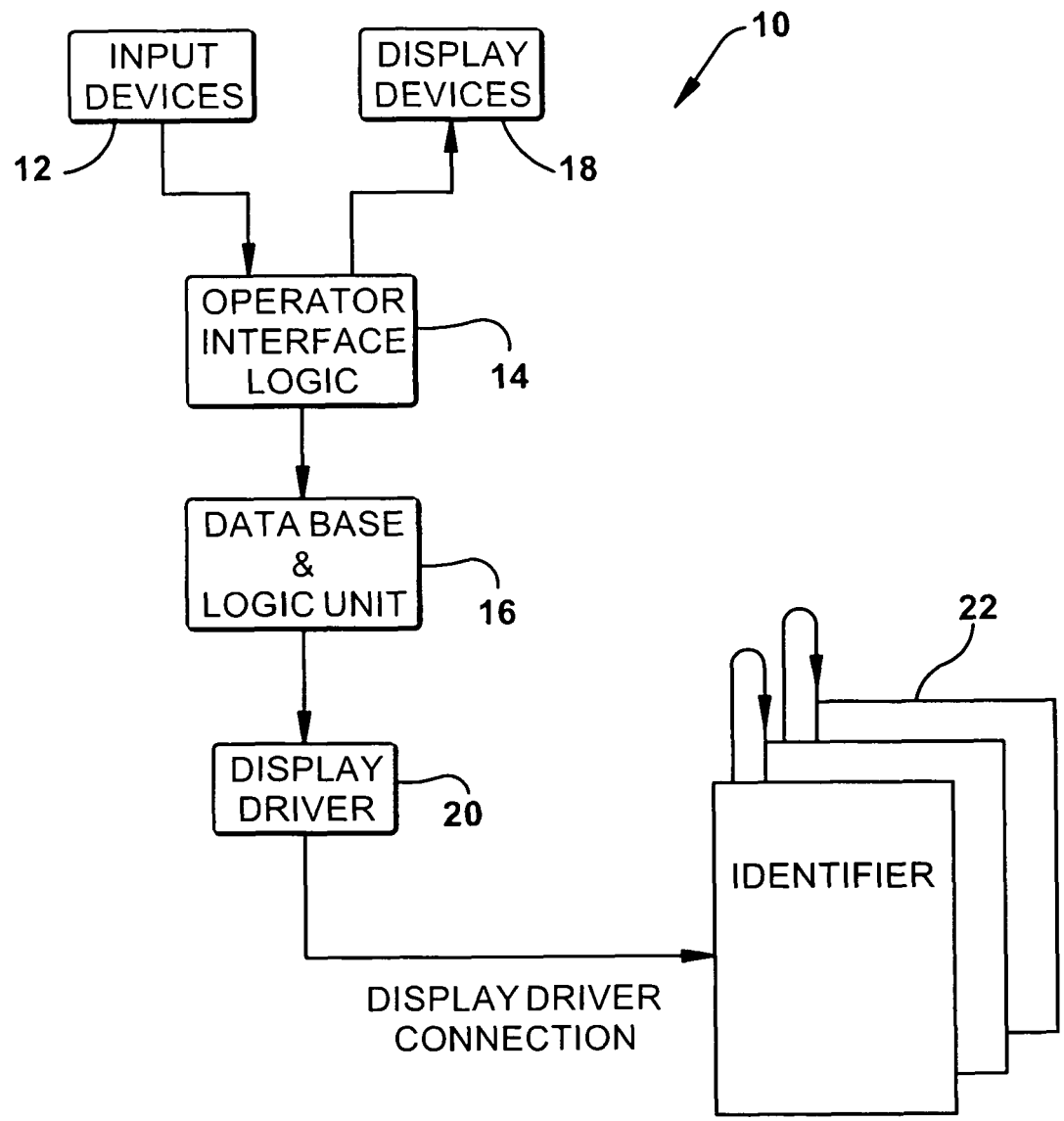
FIG. 1 is a schematic representation of a possible configuration for a retail identification system.

While the retail identification system is described illustratively herein with reference to fasteners, it should be clear that the invention should not be limited to such uses or embodiments. It should be clear to those in the art that this invention could be utilized for any retail objects that possess minute yet important nuances or functional variables. The description herein is merely illustrative of an embodiment of the invention and in no way should limit the scope of the invention.

The retail identification system as described herein provides its user with a system for identifying objects possessing minor, yet extremely important, physical differences or variables. The system is implemented using relatively simple techniques and without the need for complex, specialized equipment or extensive user training. The system has particular applicability in the field of fasteners, although it should be understood the invention is equally applicable in any number of other fields where a multiplicity of relatively fungible components are prevalent, including but not limited to auto parts, home furnishings, tools, computer-related products, office supplies, cosmetics, books, jewelry, clothing, or any other such retail objects. Similar systems are described in commonly owned U.S. patent application Ser. No. 10/633,933, entitled "Object Identification System," which is hereby incorporated by reference in its entirety.

Moreover, it should be understood that the system is particularly designed to be user-friendly in order to encourage its widespread implementation in a consumer-oriented environment. In fact, users of the inventive system will most likely be customers seeking to identify and purchase the object that is identified by the system or relatively unskilled laborers in need of identifying objects in remote or field-based situations (rather than trained employees or experts).

The system itself relies upon a database to transform operator inputs, provided through an operator interface, to accurately identify an appropriate match or matches for the retail object in question. Typically, the input will be based upon easily identifiable traits found on the mast object, such as alphanumeric identifiers, lengths, head types, thread types, intended use(s) of the object (e.g., a wood fastener versus a concrete fastener) and the like. In keeping with the invention's stated goal of user-friendliness and in stark contrast to the "eyeballing" system described above, only limited (if any) physical manipulation of the object or reliance upon other implements is necessary in order to determine these inputs. For example, with respect to a system for screw identification, some typical inputs required (and the corresponding variables contained in the database) might include: intended use (i.e., concrete, wood, steel), head style, material of construction, length, drive type (e.g., Phillips), and the like. Ultimately, the nature of the information will be inherent to the peculiarities of the master object itself.

The database itself may be used and accessed as locally installed software, as a network-based application, as part of an integrated circuit or in any other known manner. As above, the intended use of the invention will impact the precise way by which the database is included in or delivered to the inventive system. For example, with respect to a fastener identification system, the most practical implementation scheme may be through the use of a common, over-the-counter personal computer, in conjunction with the elements described below, so as to allow for easy and widespread implementation as a user-friendly kiosk in hardware stores and other retail locations.

Functionally, the database compares and cross-references a plurality of known variables against at least one input provided by the user in a manner that is well known to those skilled in the arts of software and computer-related inventions. This database information can be updated periodically based upon use of the system, specific-inputs by the user, or according to a set schedule. While it is presently preferred to have the database and associated information stored locally on a device, it is contemplated that such information could also be accessed via the World Wide Web or obtained from a remotely located database via a computerized network (e.g., local area network, wide area network, etc.).

In some cases, the database output may include a number of items that represent a set of the closest or most appropriate matches for the user. In these instances, the database itself will be programmed to automatically search for and determine the occasions when multiple matches are appropriate, and the output from the database to the user will be provided accordingly.

The operator interface, and the ultimate database output, should be based upon a familiar and user-friendly system. Touch screens, dedicated push buttons (e.g., YES, NO, etc.), mouse like pointers, regular computer keyboards and/or similar input devices that are familiar to an average consumer are the preferred interfaces. Further specifications for a preferred embodiment of the operator interface, along with numerous other details related to the specific application of these inventive principles to a fastener identification system, are given below. Likewise, the output display should be in the form of a monitor, printed material or visual display.

The invention may include other related software applications, in conjunction with the database, to further increase the accuracy and efficiency of the system. These applications include, but are not limited to the following:

an inventory database that can track system use and remind the retailer to order or automatically reorder retail objects that may be in low supply;

(b) an update utility for the database to permit incorporation of new or replacement information for the retail objects;

(c) a "Help System" that explains the identification process and includes trouble shooting guide(s) for the system itself, along with any secondary systems that may be incorporated therein. The Help System may also incorporate a training video or system to educate the retail employee or customer regarding the identification process if the device is a point-of-purchase device; and (d) a historical log that provides detailed tracking of the results provided to the user. Such tracking logs may be helpful in determining user preferences, enhancing marketing strategies, automatically adjusting the settings of the system to display certain items or preferentially request certain inputs and other reasons that will be inherent to the particular application in which the system is used. These logs will be particularly useful in the event that the identification system is linked to mass communication systems such as a computerized network or the Internet. Also, these logs could, in some instances, be operatively connected to or part of the aforementioned inventory database.

Notably, keeping in mind that a monitor, CRT or video system is normally included in most computer systems, the output of the present invention includes a specially designed identifier 22 that highlights or otherwise communicates possible matches for the operator's further visual examination and/or use. Such an identifier 22 could be connected directly to a common serial, parallel, USB or other communications port (wired or wireless) found on many personal computers. Thus, the system is highly adaptable and, to the extent that laptop personal computers are easily transported, mobile. Ultimately, the primary goal is to simplify and enhance the use of the system by its intended operators-consumers or inexperienced employees who have not been trained in the nuances of the identification process in question.

Still other automated devices, such as movable, motorized units, such as silo spinners (which would revolve so as to present one compartment or a series of related compartments to the user), or a robotic retrieval system (which would rely upon a combination of motors in two or three dimensions to cause an arm-like device to find, grasp and move the object to a desired location), could be included to further enhance the identification and retrieval system. Integration of such an automated system with the historical logs and/or networked capabilities of the system mentioned above would ultimately allow for the seamless retrieval, re-ordering and/or restocking certain items on the storage/dispenser.

Figure 2:
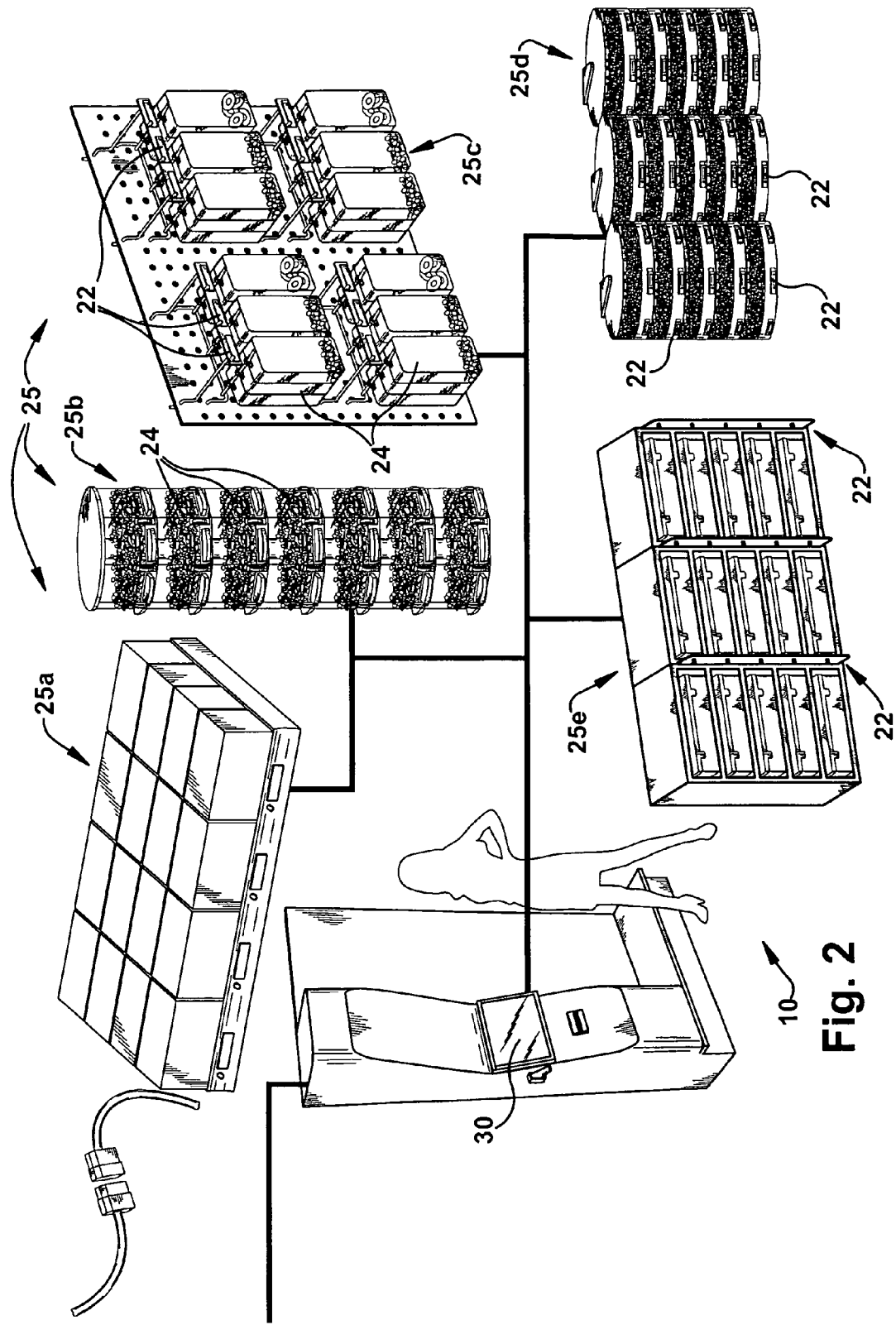
FIG. 2 is a diagrammatical representation of a possible configuration for a retail identification system.

FIG. 1 shows a schematic, generalized representation of the retail object identification system. Identification system 10 includes input device 12 operatively associated with an operator interface system 14. Interface 14 interacts with database and logic unit 16 so as to produce the output described above. Logic system 14 then produces and displays the appropriate outputs on display panel 18. Concurrently, the output from database 16 is also be sent to a device driver 20 in order to transform the output into a compatible set of instructions for one or more identifiers 22 associated with a variety of fastener compartments 24 of units 25 (as shown in FIG. 2). Notably, the interface 14, database 16, and device driver 20 can all functionally be part of a single computer processing unit, such as touch screen 30, as shown in FIG. 2. By the same token, display panel 18 could represent a standard CRT, monitor or other video system that is commonly sold as part an over-the-counter personal computer system.

As shown in FIG. 2, a Graphical User Interface (GUI) 30 is provided that may have drop down windows for various information fields. The results of possible fastener matches may then displayed on a video screen, as well as with identifier 22 located on or near the compartments 24. The operator can simply enter the known or identified features or information about the fastener into the appropriate window of the GUI 30. The database algorithm could also prompt the operator with a series of pertinent questions for the user to answer, thereby leading to necessary inputs.

The GUI 30 may prompt the operator for inputs by presenting blank information fields in combination with drop down menus to identify all of the possible choices available to the user. These choices will be modified by the program as additional information is input, and the user can actually see the possible matches and other information in real-time on the basis of the answers provided. The GUI 30 can be displayed on a multitude of general computing devices including but not limited to general personal computers, personal digital assistants (including those combined with or functioning as cell phones), many hand-held devices, and numerous other user interfaces. The user interface would be programmed to contain multi-lingual support so that users have the option of choosing the language with which they are most comfortable.

The information input into the system will enable the algorithm to select the appropriate fastener for identification. All selected fasteners can be located with the help of the identifier 22 for easy retrieval by the user. Preferably, based upon these inputs, a single fastener will be identified. When no single fastener is an exact match, a series of fastener possibilities may be identified. In the event an automated retrieval system is incorporated, the software can be programmed to afford the user with the option of retrieving all of the possible matches or entering additional inputs to further winnow down the potential matches.

Identifier, 22 can be constructed from common components, including, but not limited to, bulbs, LEDs, LCDs, speakers, and related circuitry widely available in consumer electronics stores. As shown in FIGS. 2-6, it is to be understood that the identifier 22 may be secured to or near the compartment 24 of the unit 25 such as a skid 25a, bulk silo spinners 25b, pegged product stands 25c, specialty fastener silo spinners 25d, divider systems 25e, and the like. Therefore, when the user inputs data into the GUI 30 and a match is made, the identifier 22 is capable of communicating to the user the location of the appropriate fastener. In an illustrative example, moveable or otherwise rotatable storage units 25, such as silo spinner 25b, may be provided with a motor controlled by the system 10. When a match is made, the system 10 would activate the motor and turn the unit 25b so that the compartment 24 containing the appropriate fastener (and associated identifier 22) is accessible by the user.

Figure 3:
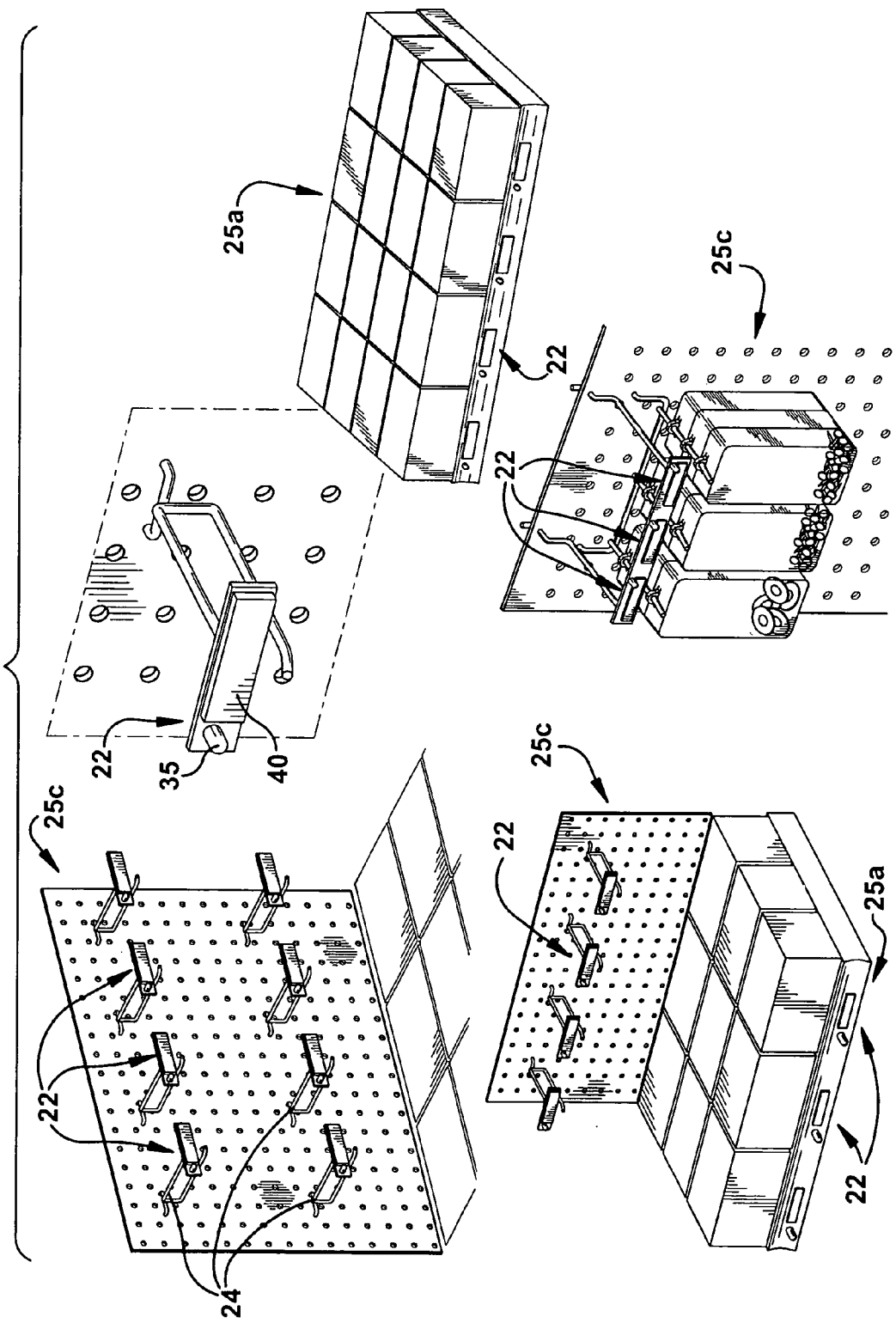
FIG. 3 is a perspective view of units and identifiers in an embodiment of the system.
Figure 4:
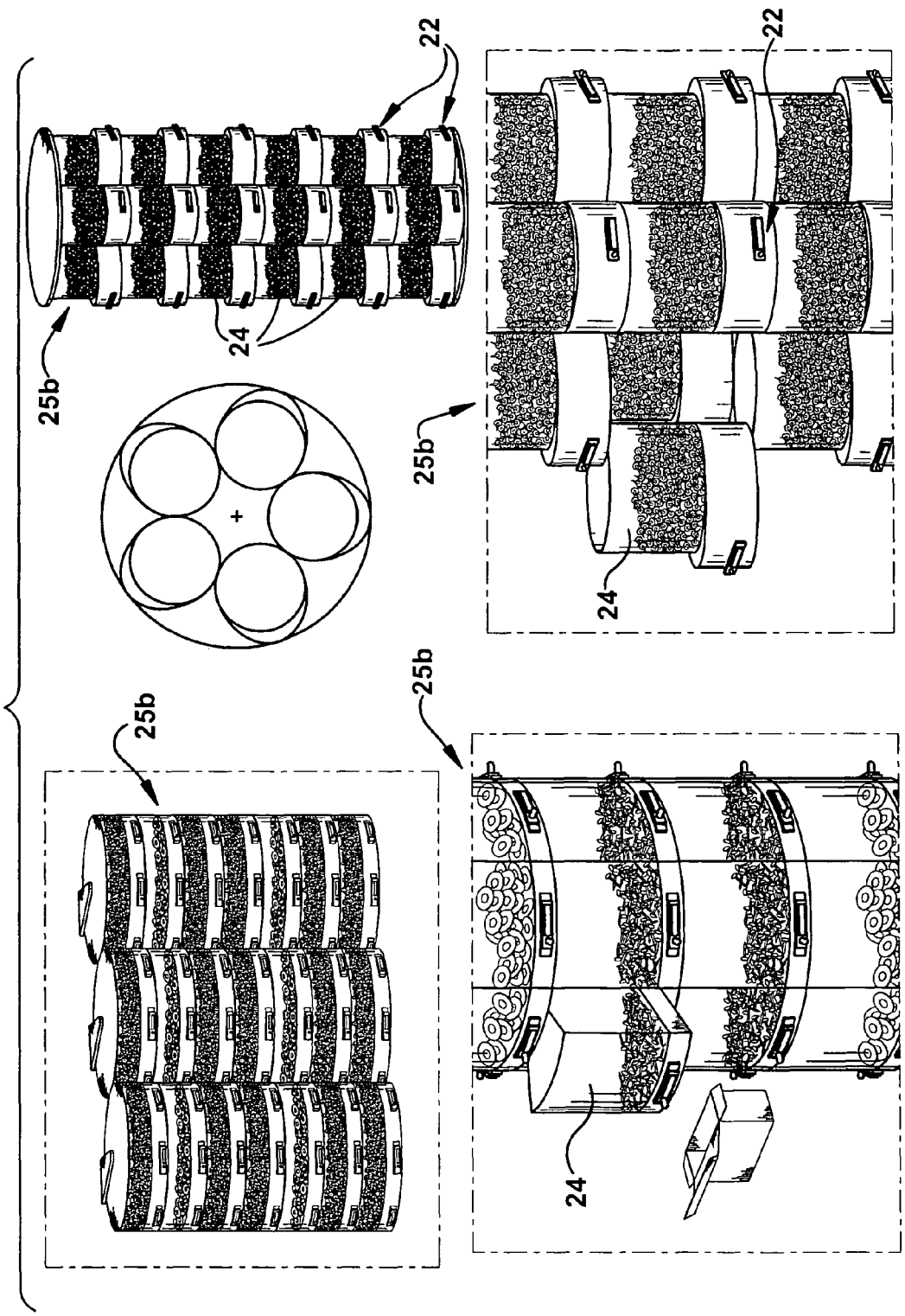
FIGS. 4-6 are perspective views of units, compartments, and identifiers in an embodiment of the system.
Figure 5:
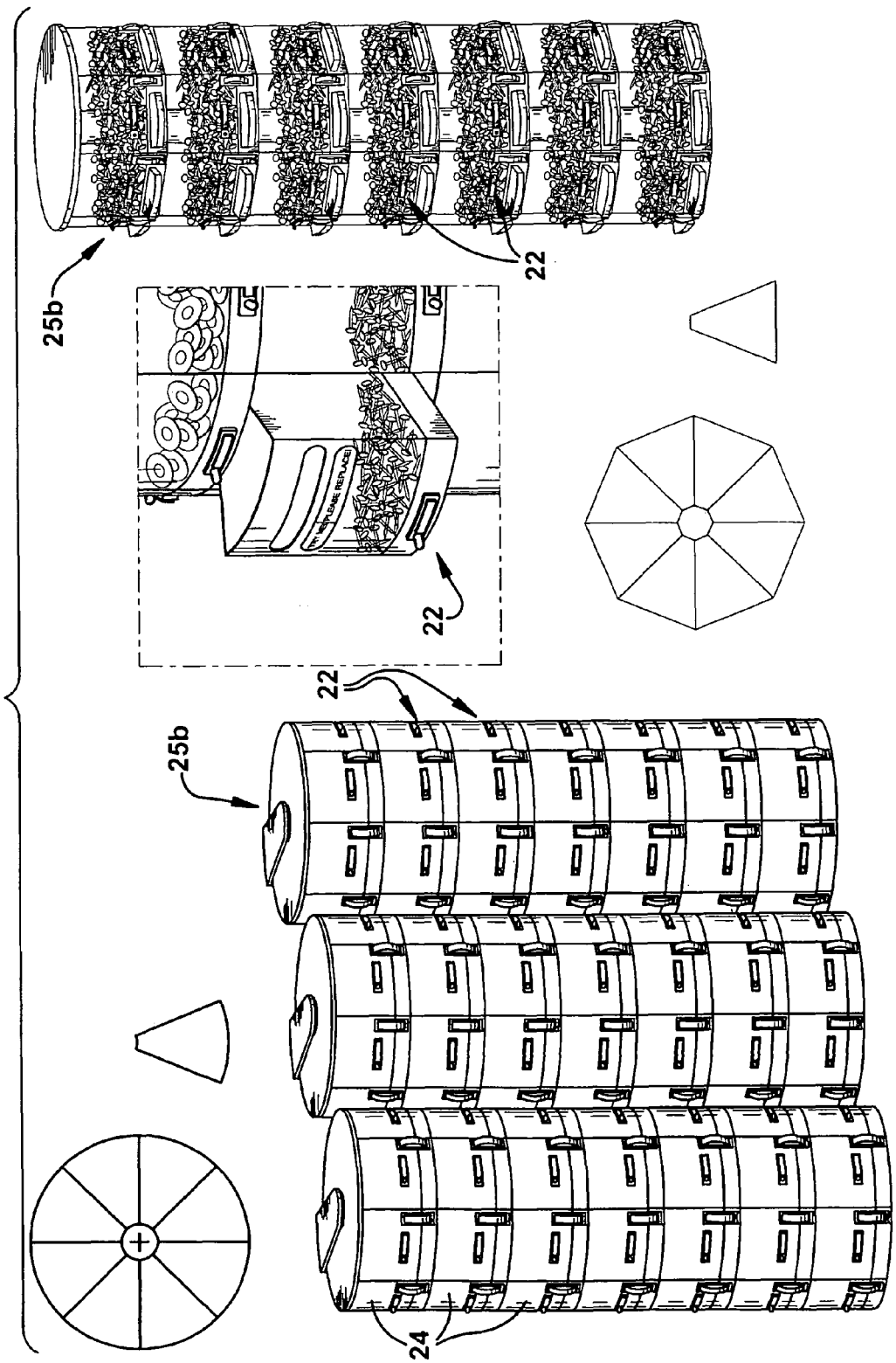
Figure 6:
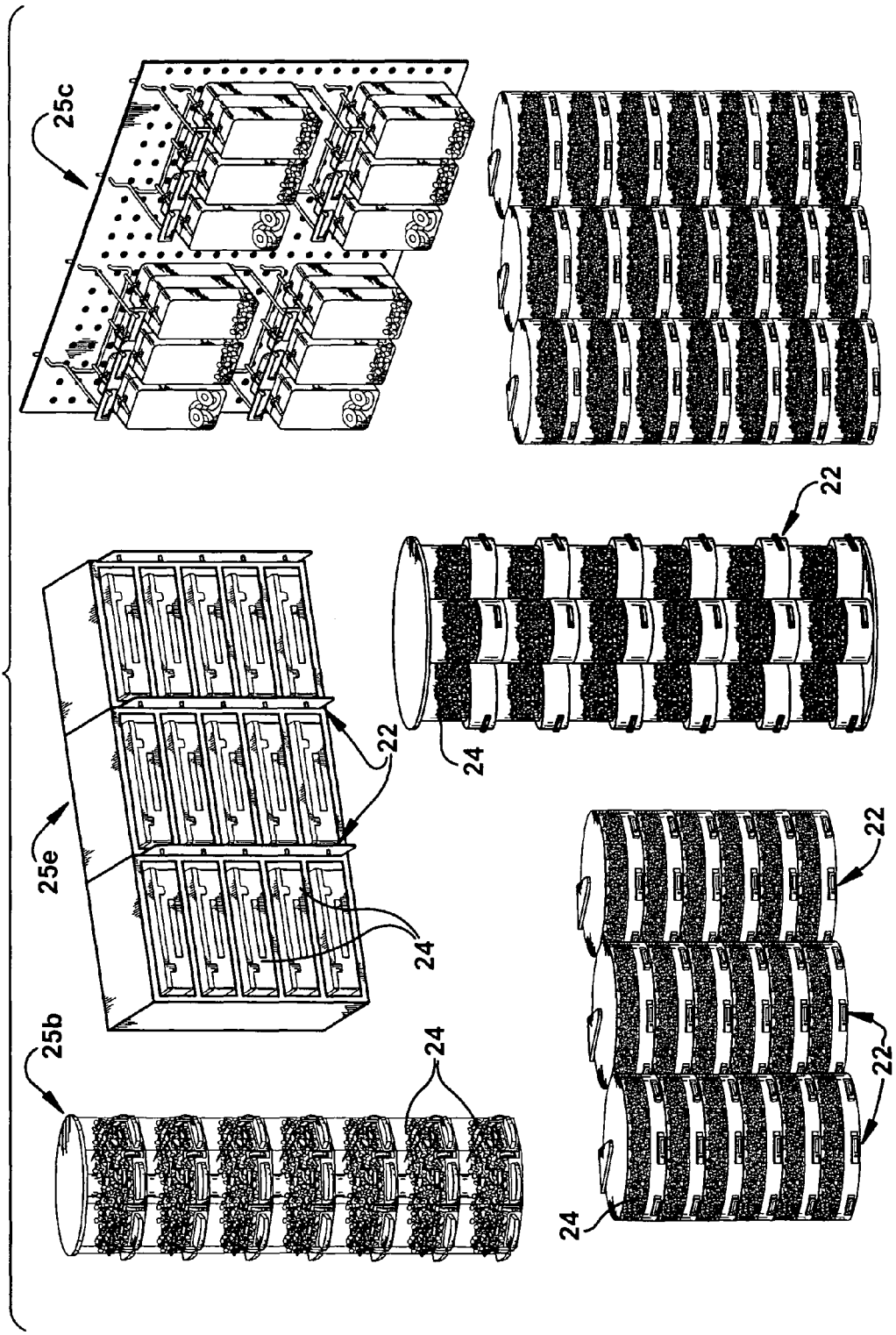

In an illustrative example, as best shown in FIG. 3, the identifier 22 may include both an LED 35 and an LCD 40. When a match is made, the LED 35 may light up or flash to communicate the location of the fastener to the user. The LCD 40 may display information about the fastener such as the type, size, material of construction, price, and any discounts or promotions. It is to be understood that the information displayed on the LCD 40 may be updated locally, or accessed via the worldwide web or obtained from a remotely located database via a computerized network (e.g., local area network, wide are network, etc.). Such interaction would permit the storeowner to easily modify the information displayed on the LCD. For example, the price of the fastener could be easily changes and displayed on the LCD without having store personnel change bin or price labels.

Figure 7:
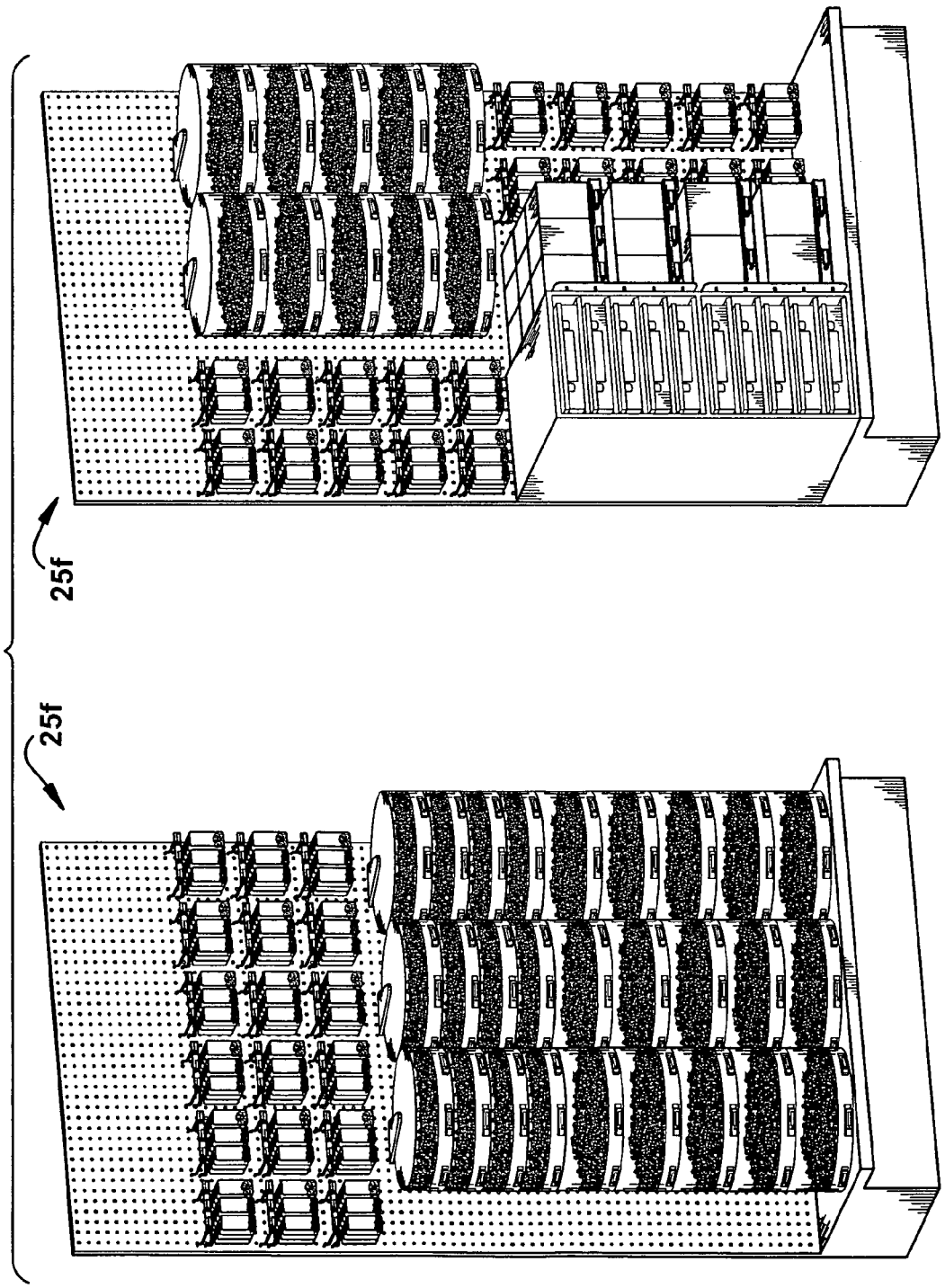
FIGS. 7-8 are perspective views of customizable, modular units in an embodiment of the system.
Figure 8:
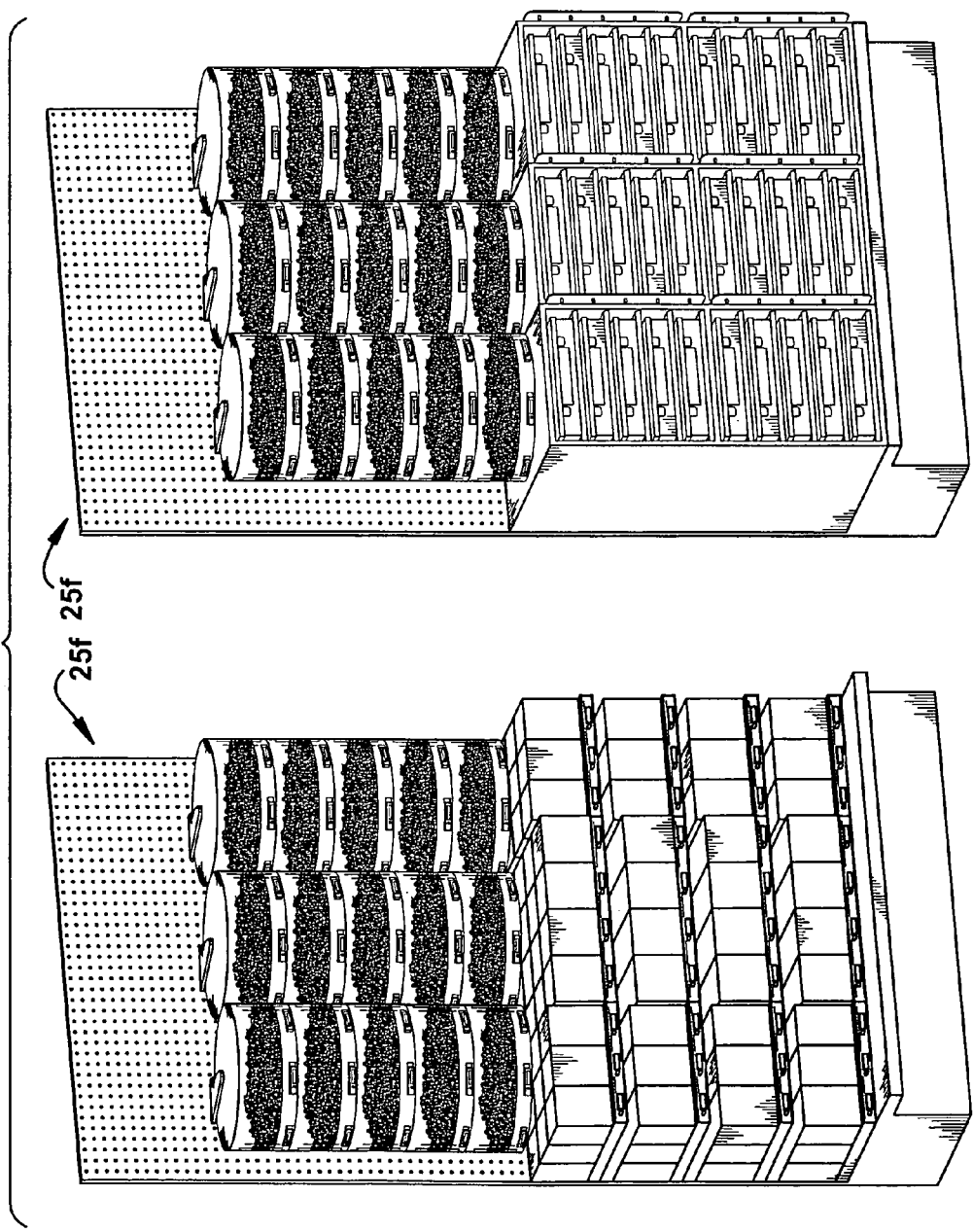
Figure 9:
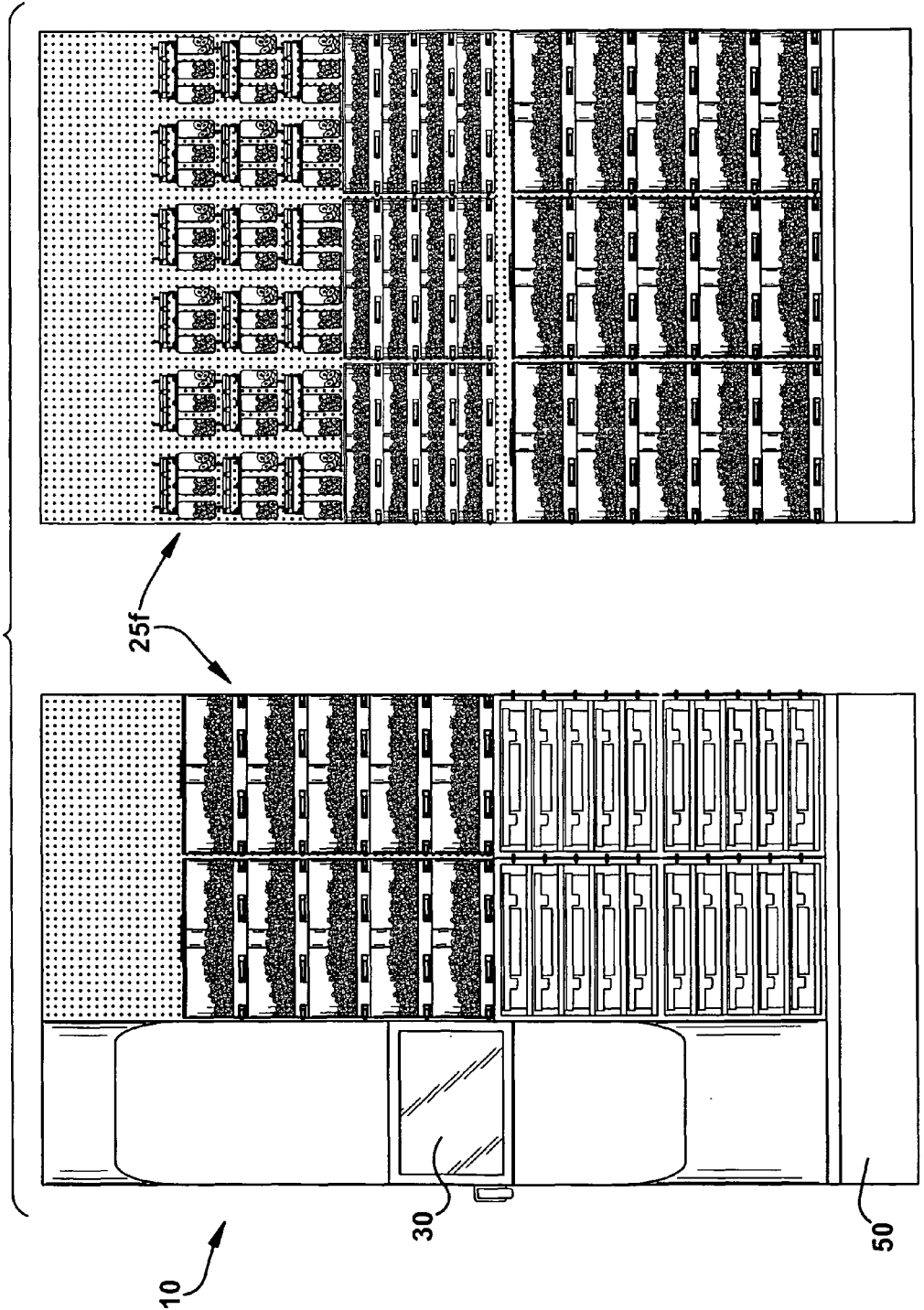
FIGS. 9-10 are perspective views of customizable, modular units with a graphical user interface (GUI) in an embodiment of the system.
Figure 10:
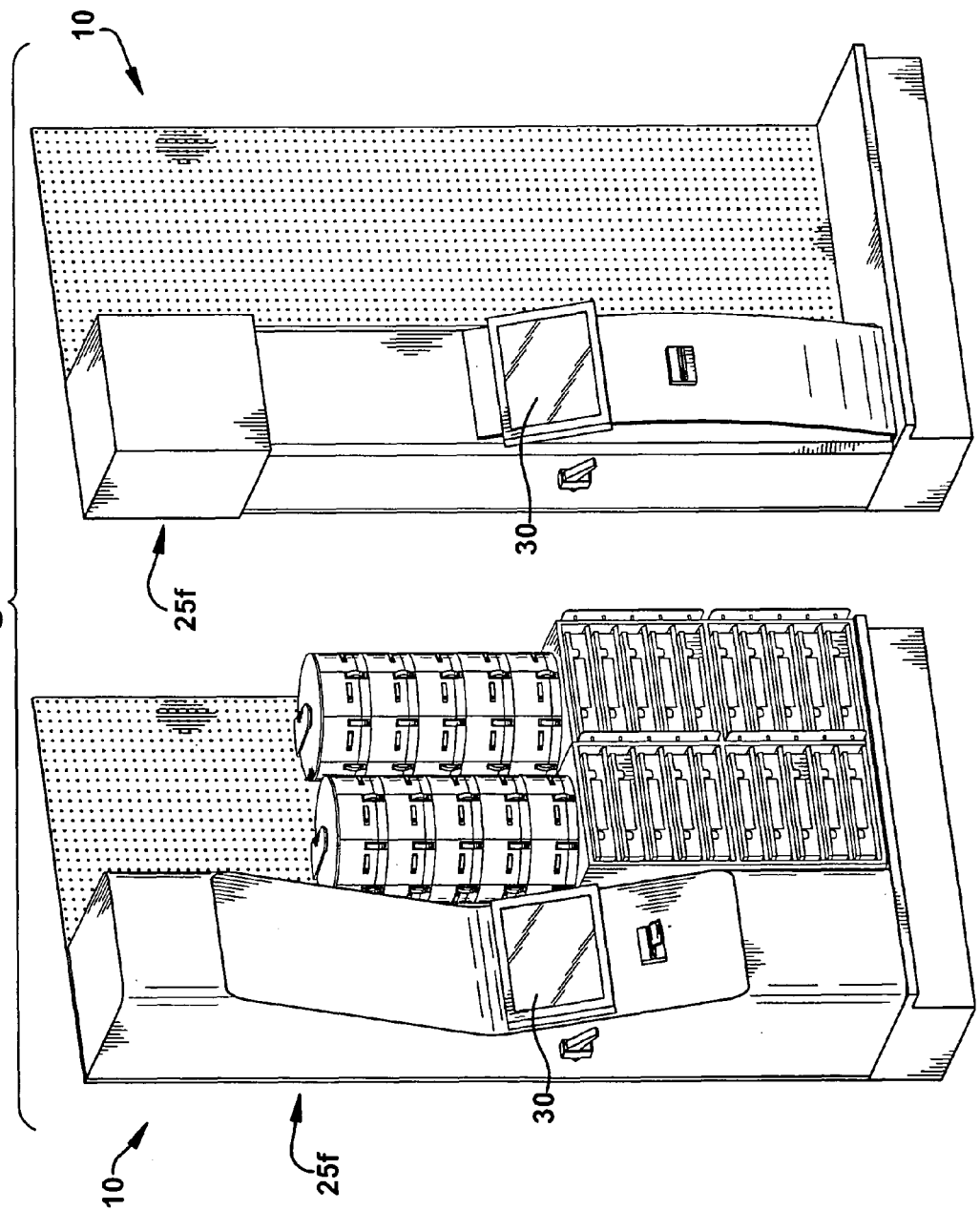

As shown in FIGS. 7-8 the system 10 may also include customizable modular units 25f that include a variety of units 25a-e. Further, as shown in FIGS. 9-10, the system 10, including units 25f, could be positioned on a common support 50. In one illustrative example, the system 10 may be positioned over an existing gondola, thus modernizing existing in-store hardware. The system's 10 modularity allows it to be constructed to meet the retailers' needs at a low cost of installation.

Figure 11:
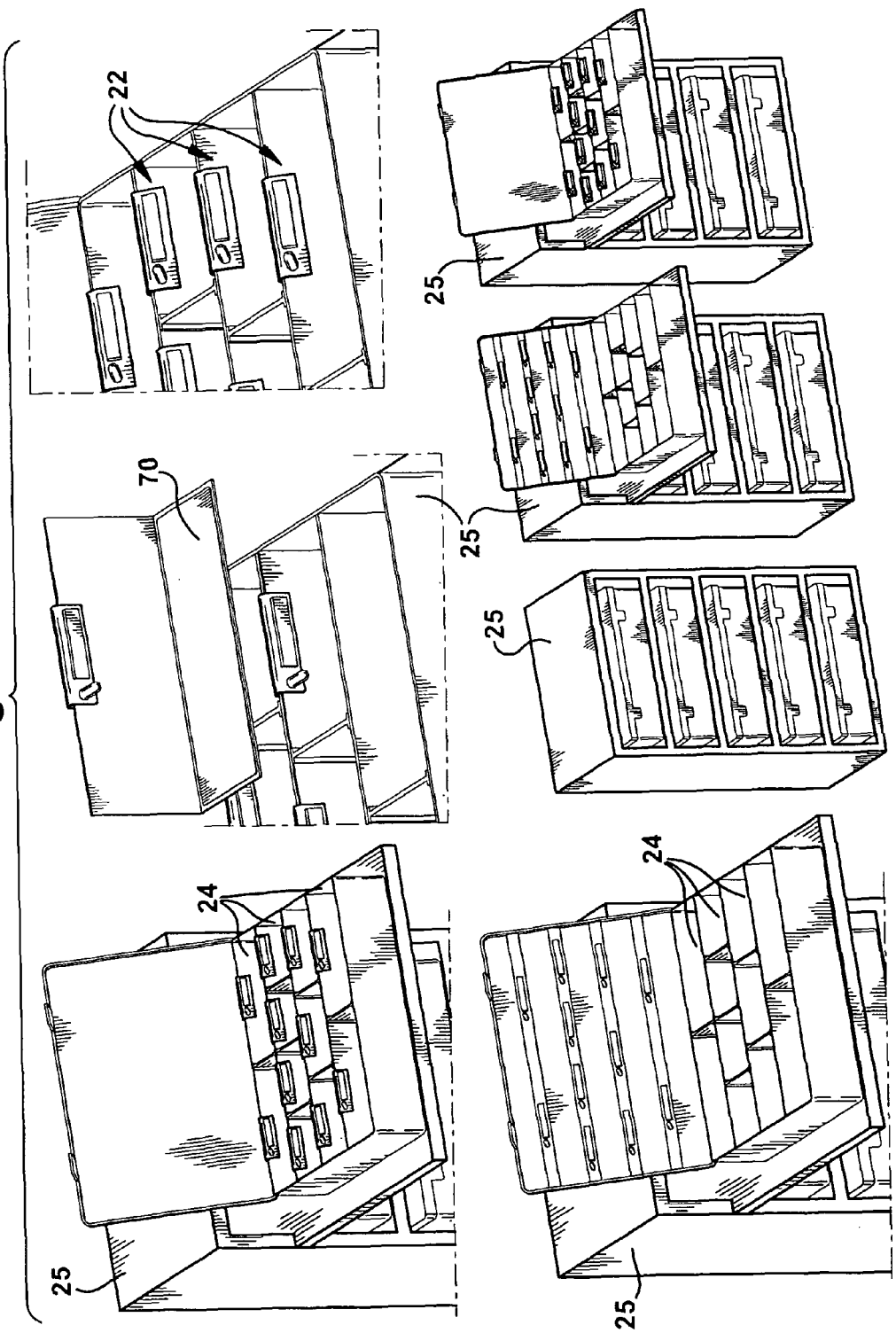
FIG. 11 is a perspective view of units, compartments, identifiers, and load cells in an embodiment of the system.

Further, the system 10 allows existing units 25 to be retrofitted for use within the system 10. For example, identifiers 22 may be easily installed on existing peg boards 25c, skids 25a, and the like, without extensive labor (especially when implemented with in a wireless configuration). In another illustrative example, as shown in FIG. 11, one or more load cells 70 may be positioned in the fastener compartments 24 of the units 25. The load cells 25 may be used to provide a real-time estimate of the quantity of fasteners dispensed and/or remaining in the particular compartment 24.

Figure 12:
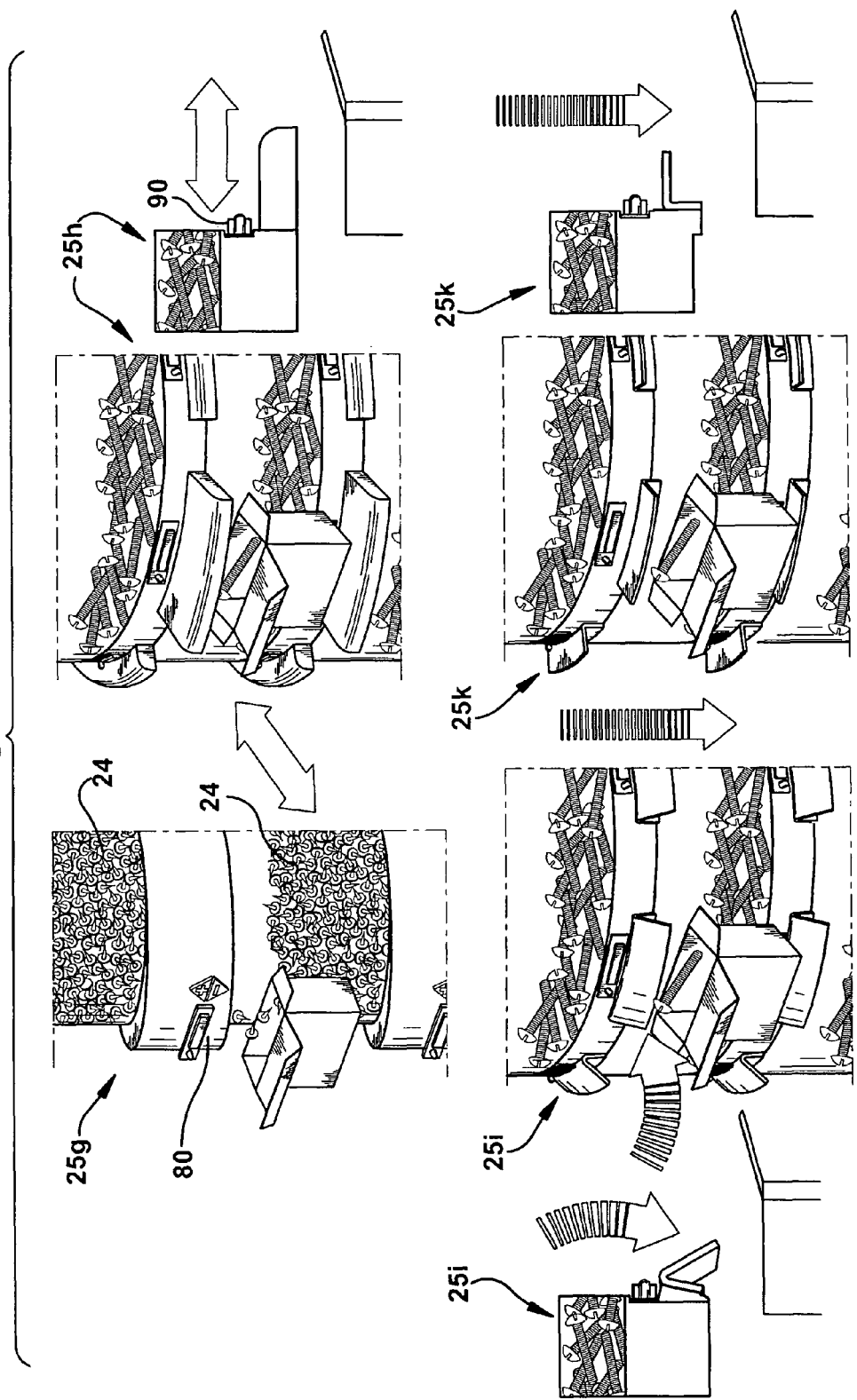
FIG. 12 is a perspective view of units having a variety of dispenser options in an embodiment of the system.

In another illustrative embodiment, as shown in FIG. 12, the compartments 24 and/or the units 25 may be provided with a number of dispensing options for providing the user with the desired number of fasteners. For example, the compartment 24 of a unit 25g may be provided with user a user input 80, such as one or more buttons, to allow a user to input the number of fasteners to dispense. It is to be understood that the unit 25g may communicate with the system 10 to provide a real-time accounting of the number of fasteners dispensed and/or remaining in the unit 24. In another illustrative example, the user may input on the GUI 30 the quantity of fasteners to dispense, and the system 10 may automatically retrieve and provide the fasteners to the user at the GUI 30 or checkout counter.

Notably, the wiring required to light all of the LEDs is actually rather complex, especially in the event that additional modular units 25f are added to the system. Furthermore, the high speed switching needed to create and maintain the appearance of multiple, lit locations (indicators) on the board requires relatively expensive drive electronics.

To overcome these difficulties, the modular units 25f may utilize a combination of shift registers. Shift registers are readily available integrated circuits that can control a number of outputs (typically 4 or 8) with minimal input signals.

Because they are designed for use in series, any number of shift registers can be placed in series to drive as many LEDs as desired.

For a system with two modular units 25f, each modular unit 25f may utilize an 8 bit shift register. A power supply is provided to each register, along with 3 input signals: data, clock, and strobe. Significantly, a strobe signal would normally be needed to transfer the data from the shift register to a buffer in the shift register (the buffer allows all the outputs to be changed at the same time by the strobe signal), but through the use of a clock signal in place of a strobe signal/buffer combination, rapid shifting of new data sets can be achieved. Thus, the clock signal eliminates the need for a strobe signal and buffer because of the speed at which data is shifted. For example, a panel with 320 individual LEDs can be made with only 40 shift register integrated circuits wired in series and without the need for individual buffers or strobe signals Additionally, a separate computer would normally be needed to receive data from the database computer and continuously scan the LEDs at a high speed in order to give the appearance that several LEDs are illuminated at the same time. However, the modular unit 25 of the present invention only needs to be altered when its input data (from the database) changes. Thus, the new shift register based embodiment only needs to be driven when the data changes. Most of the time it simply displays the most recent data, such that the reduced drive requirements can actually be met by the database computer itself, and without the need for a separate computer.

Manual dispensers may also be provided on the compartments 24, as shown on units 25h, 25i, and 25k. It is to be understood that the manual dispensers may also be in communication with the system 10. As shown in FIG. 10, unit 25h may include a gate 90 that dispenses a predetermined number of fasteners when pulled toward the user. Accordingly, the user may pull the gate 90 until obtaining the desired number of fasteners. In an embodiment, each time the gate is pulled 90 the system is notified to provide a real-time estimate of the number of fasteners dispensed and/or remaining in the compartment 24.

Similarly, the units 25i and 25k illustrate other non-limiting examples of manual dispensing configurations. As shown in FIG. 10, unit 25i includes a gate 90 having a pivot down action for dispensing the fasteners, while unit 25k requires the user to push the gate downward to dispense the fasteners. It is to be understood, however, that the examples are not intended to be limiting, as one of ordinary skill in the art would appreciate a variety of dispensing methods. It is also to be understood that units 25g, 25h, 25i, and 25k may also be configured to receive money and operate essentially as a vending machine.

It is to be understood that the software package of the system 10 can be specially developed utilizing known software programming techniques, operating systems and device drivers, can be downloaded or accessible via a computerized network or provided via standard distribution channels and means (burned to CDs or DVDs, provided on an integrated circuit, etc.). Thus, it can be seen that the system 10 can be easily implemented without the need for expensive or highly specialized equipment.

Moreover, the system 10 could also display other information about related products or other items that may be of interest to the user. For example, if the fastener is identified as a concrete fastener and the system is installed in a hardware store, concrete accessories also sold by that store could be identified in the output of the system 10. Further, projects could be identified by code and such a code could be entered into the system and all the relevant materials necessary to complete that project could be identified by the system.

The system 10 may also be equipped with a software application to provide inventory assistance to the retailer or distribution outlet. The inventory information stored within the database provides real-time and/or offline access to a variety of variables, including but not limited to inventory levels of all fasteners, the make and areas of use for the fasteners, and recent or expected sales activities (based on projections from the historical information). Additionally, the inventory system could be configured to notify the operator of the need to restock or to actually perform automated restocking of fasteners by having the system electronically order the necessary items. Furthermore, this inventory notification system provides information for restocking on a local store basis, regional basis, or by national store brand.

The system 10 may also include a software application to provide updates to a variety of system software packages including but not limited to the fastener index or the database selection algorithm in a variety of methods including but not limited to real-time downloads, offline configuration disks and other methods known in the art. The update software application may also be able to provide other applications (either embedded within the database or as seemingly stand alone programs) to further the efficiency and capabilities of the fastener identification system.

The historical log application associated with the system 10 provides a detailed tracking mechanism for numerous variables. Essentially, this application could act as an auditable function for monitoring and recording information about the use, inputs and results generated by the system 10. In particular, the historical log could include, but is not necessarily limited to, data for each sale of a certain fastener, lost sales due to lack of fasteners, lost sales due to lack of substitutions for fasteners, and any miscellaneous information the operator deems pertinent to the sale or lost sale. Other simple and easy functions provided within the framework of the historical log application would involve adding or modifying the data fields, resetting the logs, extracting customized reports from the data and selectively toggling between tracking modes.

It is also possible to utilize the system 10 as part of a larger system for storing, shelving, or putting away fasteners, in addition to the aforementioned identification functionality. By inputting information into the system 10 about the appropriate fastener (thereby illuminating an LED 35), the retailer may identify and stock the appropriate compartment 24. Furthermore, the software implementing the database engine of the present invention could be further modified to have a driver or subroutine which interacts with inventory software so as to add further seamlessly coordinate both systems (inventory and identification). Mechanical means could also be implemented to automate the retrieval. Moreover, by using robotic retrieval systems in conjunction with appropriate software and drivers that recognize and reorder inventory stocks without user intervention, the restocking of fasteners (or other objects) could be completely automated. To be certain, such additions may add a level of complexity to the invention; however, these complexities would be mitigated by the corresponding increase in user-friendliness and efficiencies thereby achieved.

The invention has been described above and, obviously, modifications and alternations will occur to others upon a reading and understanding of this specification. The claims as follows are intended to include all modifications and alterations insofar as they come within the scope of the claims or the equivalent thereof.

Having thus described the invention, we claim:

1. An interactive retail identification system for identifying one or more retail objects based upon known or identified features of a master object, said system comprising:
   a user interface located at a first structure comprising an input device for prompting a user with one or more input choices related to a physical attribute of the master object based upon a physical inspection of the master object;
   a database containing information related to a plurality of retail objects for identifying one or more specific retail objects that match the inputs selected by the user;
   a plurality of storage locations for holding retail objects, said storage locations located at a second structure away from said first structure;
a plurality of indicators each located at a storage location for identifying the storage locations of one or more retail objects identified by the database; and
wherein said database is configured to narrow the field of retail objects that match the physical attribute input by a user and update all indicators related to retail objects that match the input choices in real time.

2. The system of claim 1, further comprising a tracking component for recording and monitoring variables related to utilization of the system.

3. The system of claim 2, wherein the variables recorded and monitored by the tracking component include information related to inventory levels of the retail objects in the storage locations.

4. The system of claim 3, wherein the system operates over a computerized network.

5. The system of claim 4, wherein the database is selectively updated via the computerized network and wherein the computerized network is selected from the group consisting of: a local area network, a wide area network and the internet.

6. The system of claim 5, wherein the tracking component transmits the variables related to utilization of the system over the computerized network.

7. The system of claim 6, further comprising a user help component for providing the user with assistance in operating the system.

8. The system of claim 7 wherein the retail object is a fastener article.

9. The system of claim 8, wherein the fastener article is selected from the group consisting of: a screw, a nut, a bolt, a washer, a pin, or a hook.

10. The system of claim 9, wherein the system is configured to confirm that the retail object matches the features of the master object.

11. The system of claim 10, wherein the system further comprises a radio frequency identification device.

12. The system of claim 1, wherein the indicator further comprises: an LCD display configured to displaying information related to the identified retail object.

13. The system of claim 12, wherein the LCD display configured to display the price of the retail object.

14. The system of claim 13, wherein the user interface is a touch screen display.

15. The system of claim 1, wherein the plurality of storage locations comprises at least one spiral compartment configured to holding retail objects.

16. The system of claim 15, further comprising a motor operably connected to the spiral compartment and configured to rotating the spiral compartment to reveal spiral compartments having the identified retail object.

* * * * *